United States Patent
Weiss et al.

(10) Patent No.: US 8,591,793 B2
(45) Date of Patent: Nov. 26, 2013

(54) PRESS FELT FOR PAPER MACHINE AND METHOD AND DEVICE FOR PRODUCING SAID FELT

(75) Inventors: Alfred Weiss, Tamins (CH); Klaus Bender, Bonaduz (CH); Jürgen Spindler, Domat/Ems (CH)

(73) Assignee: Ems-Chemie AG, Domat/Ems (CH)

( * ) Notice: Subject to any disclaimer, the term of this patent is extended or adjusted under 35 U.S.C. 154(b) by 1929 days.

(21) Appl. No.: 11/547,673

(22) PCT Filed: Apr. 7, 2005

(86) PCT No.: PCT/CH2005/000200
§ 371 (c)(1),
(2), (4) Date: Jun. 5, 2007

(87) PCT Pub. No.: WO2005/098128
PCT Pub. Date: Oct. 20, 2005

(65) Prior Publication Data
US 2008/0038975 A1    Feb. 14, 2008

(30) Foreign Application Priority Data
Apr. 8, 2004    (CH) ........................................ 0614/04

(51) Int. Cl.
*B29C 43/22*    (2006.01)

(52) U.S. Cl.
USPC ....... 264/280; 264/173.1; 264/556; 264/46.3; 264/172.18; 264/172.19; 264/173.11; 264/175; 264/46.2; 264/241; 264/324

(58) Field of Classification Search
USPC ............... 264/280, 556, 46.3, 173.1, 172.18, 264/172.19, 173.11, 175, 46.2, 241, 324
See application file for complete search history.

(56) References Cited

U.S. PATENT DOCUMENTS

| | | | |
|---|---|---|---|
| 4,099,943 A * | 7/1978 | Fischman et al. | 55/487 |
| 6,294,036 B1 | 9/2001 | Loubinoux et al. | |
| 2001/0032696 A1 | 10/2001 | Debalme et al. | |
| 2003/0194930 A1 | 10/2003 | Joyce | |

FOREIGN PATENT DOCUMENTS

| | | |
|---|---|---|
| DE | 9210235 U1 | 12/1992 |
| DE | 196 04 726 A1 | 8/1997 |
| DE | 198 03 493 C1 | 4/1999 |
| EP | 0 273 613 A1 | 7/1988 |

(Continued)

*Primary Examiner* — Christina Johnson
*Assistant Examiner* — Stella Yi
(74) *Attorney, Agent, or Firm* — Morgan, Lewis & Bockius, LLP

(57) ABSTRACT

The invention relates to a press felt for use in the press section of a paper machine. Said felt comprises a nonwoven layer lying on one of its surfaces, the surface of said layer being connected and fixed to the felt by a thermoplastic binding material. According to the invention, the surface of the nonwoven layer is smoothed by the application of pressure from a smooth surface during the cooling of said layer surface from a temperature in excess of the melting temperature of the thermoplastic binding material to a temperature below the melting temperature. To manufacture the press felt, an untreated press felt, which contains the nonwoven layer and the thermoplastic binding agent is first produced, the thermoplastic binding agent being distributed in the nonwoven layer in the form of thermoplastic adhesive fibres and/or a thermoplastic adhesive component of bicomponent fibres. The desired press felt is produced from the untreated press felt by means of the aforementioned temperature and pressure treatment using a smooth surface, thus enabling the press felt to be simultaneously thermofixed.

16 Claims, 1 Drawing Sheet

(56) References Cited

FOREIGN PATENT DOCUMENTS

| | | |
|---|---|---|
| EP | 0 287 294 A1 | 10/1988 |
| EP | 0 741 204 A | 11/1996 |
| EP | 0 969 143 A2 | 1/2000 |
| GB | 735175 A | 8/1955 |
| GB | 2 140 739 A | 12/1984 |
| WO | WO 85/01693 | 4/1985 |
| WO | WO 00/51801 | 9/2000 |
| WO | WO 02/09089 A1 | 1/2002 |
| WO | WO 03/091498 | 11/2003 |
| WO | WO 03/091498 A1 | 11/2003 |
| WO | WO 2004/085727 A2 | 10/2004 |

* cited by examiner

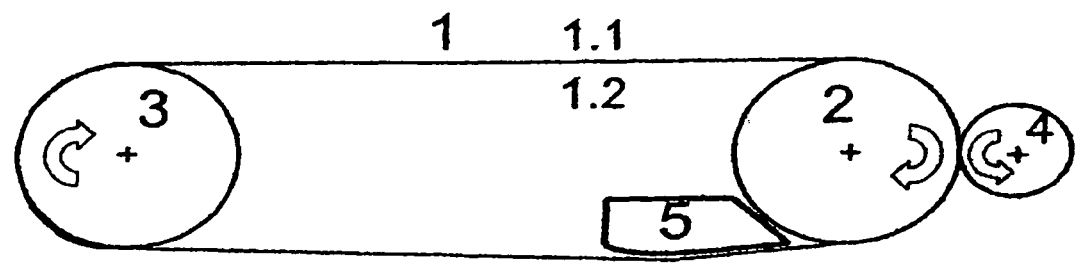

PRESS FELT FOR PAPER MACHINE AND METHOD AND DEVICE FOR PRODUCING SAID FELT

TECHNICAL FIELD

The present invention concerns a press felt with optimized layer structure for use in the press section of a paper making machine with a cover layer present on one of its sides, consisting of a nonwoven layer connected and fixed to a thermoplastic material.

The invention also concerns a method and a device for producing such a press felt.

Press felts are used in paper making machines to support the paper pulp and take up water from the pulp during the pressing process. Hence, a first important quality of press felts is their permeability.

Another important attribute of press felts is their lifetime during use on the paper making machine and, related to this, their stability without fiber loss, with moreover the most constant possible properties over the usage cycle. When the press felt has to be replaced on account of wear, quality, or damage, the paper production has to be interrupted and the paper machine halted.

A third important property of press felts is their surface texture, since this will also determine the surface texture of the paper. The more smooth and uniform the press felt, the more smooth and uniform the paper surface will be.

The demand for the smoothest possible paper is steadily increasing, since smooth paper can be better imprinted with modern printing technology. Hence, the surface texture of the press felts is becoming increasingly important.

PRIOR ART

The paper machine felts used in practice are primarily made from polyamide 6 or polyamide 66 fibers or monofilaments. EP-A 0 287 297, however, also proposes fibers of polyamide 12 and EP-A 0 372 769 fibers of polyamide 11 for this.

To improve the anchoring of the fibers, molten glue fibers are also used in part, i.e., fibers of polymers with a melting point lower than that of the other fibers (WO 85/01693).

The use of fibers with components that melt at different temperatures, i.e., especially bicomponent fibers, is likewise known. DE 92 10 235 U1 describes nonwovens made from thermoplastic spunbonded polymer fibers suitable for the production of paper machine felts, which consist of a backing fabric and at least one nonwoven layer pinned onto it.

EP 0 741 204 A2 describes the use of bicomponent fibers of the core and mantle type for the making of press felts. The selection of the bicomponent fibers of the core and mantle type is supposed to fundamentally improve the surface quality, the running properties of the felt, the recovery and the dewatering.

DE 19803493 describes special bicomponent fibers for improving the abrasion resistance, the running properties, the recovery and the dewatering. A better surface quality is likewise found.

In EP 0 741 204 A2 and DE 19803493 a better surface quality was found. But this basically relies on a better releasing of the fibers and a better covering of the upper nonwoven layers by the use of bicomponent fibers.

As already mentioned, the uniformity of the paper surface that can be achieved with a press felt is becoming increasingly more important. For this reason, development has concentrated more and more on achieving the most uniform, fine and smooth surfaces possible.

Approaches to achieving this goal are, for example, the use of very fine fibers or flat fibers in the uppermost nonwoven layer of the press felt. Subsequent coating with polymers has also been proposed and realized in part.

EP 0273613 describes, e.g., a press felt of the kind mentioned at the outset, in which the thermoplastic binder material was applied by coating. The desired surface smoothness is achieved by grinding after the coating hardens.

WO 03/091498 describes a basically similar press felt, but in which the entire felt including the backing fabric is impregnated with a reactive, cross-linking plastic dispersion. After the hardening or cross-linking, such a surface is no longer thermoplastically deformable and is therefore brought to the desired surface smoothness by grinding afterwards. In certain cases in which the desired surface smoothness can also be achieved by alternative measures, such grinding may not be needed. Alternative measures which are mentioned are the selection of the backing fabric and the fibers of the nonwoven layer, the extent of treatment with the polymer material, and the selection of the polymer as such. Furthermore, the press felt can be rolled to achieve a smooth surface. However, good surface quality cannot be achieved by mere rolling without further treatment.

PRESENTATION OF THE INVENTION

The present invention starts from the knowledge that sufficiently homogeneous and smooth surfaces in terms of the requirements placed, e.g., on the sturdiness and the permeability, cannot be achieved in every case by the use of very fine fibers or flat fibers in the uppermost nonwoven layer of the press felt. The coating technique with subsequent grinding or rolling necessitates costly additional work steps in the manufacturing process and is therefore at a disadvantage. Moreover, the surface smoothness achievable by rolling is considerably limited by the elastic tension at least of the fibers of the uppermost nonwoven layer and their tendency to restore themselves to a certain extent after the rolling. Also, good results can only be expected with very fine fibers.

The problem underlying the invention is to indicate a press felt of the kind mentioned above which, with the highest possible sturdiness and highest possible permeability even without costly grinding, has a surface that meets the increased demands for its homogeneity and smoothness.

This problem is solved according to the invention by a press felt for use in the press section of a paper machine with a nonwoven layer lying on one of its surfaces, the surface of said layer being connected and fixed to the felt by a thermoplastic binding material, wherein the surface of the nonwoven layer is smoothed by the application of pressure from a smooth surface during the cooling of said layer surface from a temperature in excess of the melting temperature of the thermoplastic binding material to a temperature below this melting temperature.

The uppermost nonwoven layer of the invented press felt is accordingly subject to pressure with the smooth surface when it has a temperature above the melting temperature of the thermoplastic binder material. The thermoplastic binder material is accordingly melted. Unlike the situation with rolling, for example, the pressure is maintained with the smooth surface until the uppermost nonwoven layer has cooled to a temperature below the melting temperature of the thermoplastic binder material and the latter has solidified. The shape of the upper nonwoven layer and its surface is thus as it were frozen in a particular condition, while the surface smoothness is determined by the smoothness of the surface used to exert the pressure. Even rather thick and more abrasion-resistant fibers in the upper nonwoven layer can no longer raise themselves and impair the surface smoothness.

The press felt of the invention can be used with advantage for the making of high-quality grades of paper, distinguished by a very uniform quality.

Thanks to its especially smooth surface and the resulting embedding of the fibers of the uppermost nonwoven layer in the thermoplastic binder material, the press felt of the invention has a good sturdiness, especially against fiber loss, in every instance, even when using very thin fibers.

Preferably, the press felt of the invention comprises at least one other backing fabric, especially a load-bearing one, as an additional layer.

As is likewise usual for press felts for paper machines, the press felt of the invention is preferably heat-fixed. The heat setting can be done with advantage in the same work step as the smoothing of the surface, as long as the thermoplastic binder material, as is likewise preferred, has a melting point which is lower that the temperature required for the heat setting. However, in view of its use in the paper machine, the melting point of the thermoplastic binder material should be at least 110° C.

Insofar as the nonwoven layer contains thermoplastic fibers, which on account of the sturdiness of such fibers is of advantage, these should have a melting point which is higher, particularly at least 30° C. higher than the melting point of the thermoplastic binder material and preferably also higher that the temperature required for the heat setting.

The thermoplastic binder material is also preferably:
   a copolyamide, which is constructed from at least two different monomers from the group of caprolactam, laurin lactam, dicarboxylic acids with 4-12 C-atoms, terephthalic acid, isophthalic acid, dimer acid with C-atoms, linear alpha, omega diamines with 2-12 C-atoms and 2-methyl pentamethylene diamine; or
   a polyamide from the group of polyamide 12, polyamide 11, polyamide 6; or
   a polyolefin, especially polyethylene, polypropylene or polybutylene; or
   a thermoplastic elastomer based on polyamide, silicone, polyurethane, polyester or polyether; or
   a copolyester.

The nonwoven layer preferably contains thermoplastic, spunbonded polymer fibers, possibly some of them in the form of flat fibers, which consist especially of polyamide from the group of polyamide 6, polyamide 46, polyamide 66, polyamide 12, polyamide 11, polyamide 6T/66, polyamide 6T/6, polyamide 6T/6I, or polyamide 12T.

The titer of the fibers used for the nonwoven layer should be less than 30 dtex, preferably even less than 8 dtex.

In regard to the preferred usage to be discussed hereafter, that of bicomponent fibers when making the press felt of the invention, the previously mentioned materials with the lower melting component for the thermoplastic binder material and with the higher melting component for the nonwoven layer are preferably used in one of the following combinations:
   copolyamide with melting point in the range of 110-180 degrees C. and polyamide 6; or
   copolyamide with melting point in the range of 110-180° C. and polyamide 66; or
   polyamide 6 and polyamide 66; or
   polyamide 12 and polyamide 6; or
   polyamide 12 and polyamide 66; or
   polyamide 6 and polyamide 6T/6I; or
   polyamide 6 and polyamide 6T/66; or
   polyamide 6 and polyamide 6T/6.

The weight ratio between the thermoplastic binder material and the nonwoven layer can be between 5:95 and 95:5, but preferably between 15:85 and 35:65. For many applications, a value of around 25:75 will be favorable.

By varying this weight ratio, one can vary and adjust as desired the permeability of the press felt, for example.

Additional nonwoven layers can also be used underneath the uppermost nonwoven layer, preferably at least one additional nonwoven layer, which is likewise fixed with a thermoplastic binder material. In this case, by varying the fibers of the additional nonwoven layer and/or the quantity ratio of fibers to the thermoplastic binder material as compared to the uppermost nonwoven layer, one can advantageously achieve an optimization of the properties of the invented press felt.

Furthermore, it is the purpose of the invention to indicate a method for production of a press felt of the above-described kind, which can be rationally implemented and avoids additional work steps.

This problem is solved according to the invention by a method which is characterized by the following steps:
   Making of an untreated press felt containing the nonwoven layer and the thermoplastic binder material, in which the thermoplastic binder material is contained in the form of thermoplastic adhesive fibers and/or as thermoplastic adhesive component of bicomponent fibers, distributed in the nonwoven layer;
   Heating of the untreated press felt to a temperature lying above the melting point of the thermoplastic binder material; and
   Cooling of the heated press felt to a temperature lying below the melting point of the thermoplastic binder material while applying pressure with a smooth surface.

According to the invention, therefore, one makes an untreated press felt (i.e., at least one not yet processed as indicated above), which contains the thermoplastic binder material initially in the form of fibers. During the heating of the nonwoven material, which is required for the smoothing, in the manner already described, the thermoplastic binder material is melted, and only now does the bonding and fixing to the nonwoven layer occur. No additional work step is needed for introducing bonding material into the nonwoven layer (or vice versa), as by coating. In any case, no additional work step is required to introduce adhesive fibers or bicomponent fibers into the nonwoven layer.

As already described above for the press felt as such, the uppermost nonwoven layer of the press felt with melted thermoplastic binder material is placed under pressure with the smooth surface while it along with the thermoplastic binder material is cooled down to a temperature below the melting temperature of the thermoplastic binder material.

In terms of method, the untreated press felt can be moved across a heated roll in order to heat it, and across a following cooling surface to cool it down.

For most applications, the press felt has to be heat set. Given a suitable choice of materials, the melting of the thermoplastic binder material, i.e., the adhesive fibers and/or the adhesive component of the bicomponent fibers, can be done as one with the heat setting, as already described, and then generally involves no additional work step. The tension which is usually also necessary for the heat setting can advantageously be used, at least in part, to apply the pressure needed for the surface smoothing.

Since the press felt is always used in the paper machine in endless form, i.e., as a seamless felt or as a stitched felt, i.e., a rotating web closed upon itself, the untreated press felt can be placed under tension (stretched) by using a conventional heat setting calender with a heated calender roller and another calender roller arranged in parallel with this, melted on the heated calender roller in respect of the adhesive fibers and/or the adhesive component of the bicomponent fibers, and at the same time be heat set. For cooldown of the molten material under pressure with a smooth surface, which then forms the connection and afterwards the fixation, it is enough to provide a cooling shoe, having the desired surface, between the two calender rollers, especially in the direction of travel of the web, immediately behind the heated calender roller, which for example pushes the web somewhat outward. As an alternative layout to the mentioned cooling device, one or more cooling rollers can also be used.

Such an enlarged heat setting calender is also an object of the present invention, as a device for making a press felt according to the invention.

To make the untreated press felt, one can use bicomponent fibers for the nonwoven layer, in which the two components are present in the core-and-mantle and/or side-by-side configuration.

When bicomponent fibers are used in the nonwoven layer, even more fine-titer monocomponent fibers and/or flat fibers can also be mixed in with the bicomponent fibers. The proportion of other fibers can be up to 95%, but preferably not more than around 75%.

According to another preferred embodiment, the untreated press felt is made from several nonwoven layers. In this case, at least one of the additional nonwoven layers can likewise contain a thermoplastic binder material distributed in the form of thermoplastic adhesive fibers and/or as thermoplastic adhesive component of bicomponent fibers. In the nonwoven layer adjacent to the surface of the press felt the ratio of the thermoplastic binder material to the other material of this layer can be chosen greater than in the at least one layer likewise provided with thermoplastic binder material.

Finally, as is customary with press felts, yet another backing fabric or a backing layer can be provided, onto which the nonwoven layer(s) is (are) stitched when making the untreated press felt.

The invention shall be further explained hereafter by means of a sample embodiment and a comparison example.

BRIEF EXPLANATION OF THE DRAWING

The drawing shows, schematically in FIG. 1, a device for making a press felt according to the invention by implementing the production method of the invention.

WAYS OF IMPLEMENTING THE INVENTION

FIG. 1 shows a specially outfitted heat setting calender. An untreated press felt 1, for a press felt about to be produced, with a load-supporting backing fabric in the region of its outer side 1.1 and at least one nonwoven layer stitched to it on its inner side 1.2, made by using adhesive fibers and/or bicomponent fibers, runs as an endless web 1 across a heated calender roller 2 and an unheated calender roller 3 under a predetermined tension. The at least one nonwoven layer is oriented against the surface of the heated calender roller 2.

The temperature of the heated calender roller 2 and the dwell time of the untreated press felt on the heated calender roller 2 is adjusted specifically to the polymer, for example, the temperature to a value between 110 and 220° C. and the dwell time to a value between 30 and 120 seconds. The heat transfer, as well as any desired compacting of the nonwoven layer(s) of the untreated press felt 1, can be intensified by one or more additional pressure rollers (4) on the heating calender 2.

A cooling shoe 5, which is located in the exit piece between the press felt 1 and the heated calender roller 2 and which is cooled with water (<15° C.), for example, cools down the inner surface 1.2 of the press felt immediately after leaving the hot calender roller 2 and sets the surface structure of the nonwoven layer(s) arranged there.

The cooling is necessary in order to achieve the desired surface quality. Without a cooling device, the felt surface would crinkle on account of stresses inside the nonwoven layer and in addition the nonwoven structure would reemerge, having a negative impact on the surface smoothness.

For a general understanding, it should further be mentioned that the press felt will afterwards be stretched on the paper making machine in precisely the reverse manner: the smoothed side 1.2 will then travel on the paper side, and the side 1.1 on the side of the rollers (guide rolls).

EXAMPLE

Example 1

Fibers from the EMS-GRILTECH division of EMS-CHEMIE AG, CH-7013 Domat/Ems, Switzerland, were used.

A first nonwoven with a surface weight of 150 g/m$^2$ was made from bicomponent fibers of type BA 140, consisting of a PA 6 component A and a copolyamide adhesive component B, made from caprolactam and laurin lactam with a melting range of 125-140° C. (monomer ratio 50:50 wt. %) in the titer 8 dtex, and 17 dtex polyamide 6 fibers of type TM 5000. The nonwoven has a bicomponent adhesive fraction of 20%.

From bicomponent fibers of type BA 140 in the titer 8 dtex, and 6.7 dtex polyamide 6 fibers of type TM 5100, a nonwoven was made with a surface weight of 100 g/m$^2$, the nonwoven having a bicomponent adhesive fiber fraction of 30%.

From bicomponent fibers of type BA 140 in the titer 3.3 dtex, and 6.7 dtex polyamide 6 fibers of type TM 5100, a nonwoven was made with a surface weight of 100 g/m$^2$, the nonwoven having a bicomponent adhesive fiber fraction of 50%.

The three nonwovens or nonwoven layers were first stitched and used to make an untreated press felt. The untreated press felt consisted of a total of one backing fabric and two nonwoven layers of 100% PA 6 fibers, and the three nonwoven layers as described above.

The total of 6 layers A-G of the untreated press felt were arranged and assembled as follows:

A: bottom nonwoven: 200 g/m$^2$, 100% PA 6 fiber, 22 dtex, TM 5000

B: backing fabric: monofilament fabric 650 g/m$^2$

C: bottom nonwoven: 200 g/m$^2$, 100% PA 6 fiber, 22 dtex, TM 5000

D: top nonwoven: 20% BA 140 (PA6/CoPA K/M 50%/50%) 8 dtex, 80% TM 5000 E: 17 dtex F: top nonwoven: 30% BA140 (PA6/CoPA K/M 50%/50%) 8 dtex, 70% TM 5100 6.7 dtex G: top nonwoven: 50% BA140 (PA6/CoPA K/M 50%/50%) 3.3 dtex, 50% TM 5100 6.7 dtex On the above-described heat setting device per FIG. 1, the thusly produced untreated press felt was heated from the paper side of the subsequent press felt (layer G) at 178° C. with a line pressure of 4 kg/cm and a dwell time of 2 min on the hot calender 2, activating the adhesive component, i.e., it was melted. Immediately after this, on the same side, cooling was done with the cooling shoe 5 at 15° C. and with a dwell time of 30 seconds, under tension with a line pressure of 1 kg/cm. Thanks to these treatment steps, a very smooth surface was achieved on the paper side of the press felt.

COMPARISON EXAMPLE

Example 2

Like Example 1, but without the cooling. The resulting press felt is not a press felt according to the present invention and it has a substantially more coarse and less smooth surface structure.

A comparison of various parameters according to the example and the comparison example leads to the following table of measured values.

| Example | Permeability* 1/m² sec, 200 Pa | Surface roughness | |
|---|---|---|---|
| | | Rz = relief mcm | Ra = mean relief mcm |
| 1 | 135 | 139 | 14 |
| 2 | 180 | 318 | 38 |

*measured with air of 22° C. at 200 Pa test pressure, measuring surface 50 cm².

A contactless microfocus device was used to measure the relief values, where:
Measuring spot diameter: 1 micron
Reference wavelength: 8 mm
Total measurement length: 40 mm
Step increment: 5 micron
Evaluation per DIN 4776

The table shows that the surface relief can be roughly cut in half thanks to the invention. The influence of the cooldown of the thermoplastic binder material under pressure with a smooth surface is therefore substantial and clearly demonstrable. Although the smoothing of the surface leads to a reduction in the permeability, this only amounts to around 25% in the table above, which is still more than satisfactory on a paper making machine.

LIST OF REFERENCES 1 untreated press felt
1.1 outer side of the untreated press felt
1.2 inner side of the untreated press felt
2 heated calender roller
3 unheated calender roller
4 additional pressing roller
5 cooling shoe

The invention claimed is:

1. A method for making a press felt with a smoothed permeable surface on its paper side for use in the press section of a paper machine, wherein the press felt comprises a nonwoven layer lying on its paper side surface, the paper side surface of said layer being bonded and fixed by a thermoplastic binding material, the method comprising the steps:
making an untreated press felt containing the nonwoven layer and the thermoplastic binder material, in which the thermoplastic binder material is contained in the form of thermoplastic adhesive fibers and/or as thermoplastic adhesive component of bicomponent fibers, distributed in the nonwoven layer;
heating the untreated press felt to a temperature lying above the melting point of the thermoplastic binder material; and
cooling the heated press felt to a temperature lying below the melting point of the thermoplastic binder material while applying pressure with a smooth surface;
wherein the untreated press felt is fashioned as an endless web and placed under tension around a heated calendar roller and another calendar roller, arranged in parallel with this, and with the paper side surface of the untreated press felt oriented against the surface of the heated calendar roller;
wherein a cooling surface is arranged between the two calendar rollers pushing the web somewhat outward thereby applying a pressing force onto the paper side surface of the untreated press felt;
wherein the untreated press felt is moved across the heated roller in order to heat it, and across the cooling surface to cool it down; and
wherein the paper side surface of the nonwoven layer is smoothed by the application of pressure from the smooth cooling surface during the cooling of said layer surface from a temperature in excess of the melting temperature of the thermoplastic binding material to a temperature below this melting temperature.

2. The method of claim 1, wherein the untreated press felt is heat set and the untreated press felt during its heating is subjected to a tension sufficient for the heat setting.

3. The method of claim 2, wherein a material is used as thermoplastic binder material, which has a melting point higher than 110° C., but lower than the temperature required for the heat setting.

4. The method of claim 1, wherein the thermoplastic fibers are used for the nonwoven layer, which have a melting point which is at least 30° C. higher than the melting point of the thermoplastic binder material and also higher than the temperature required for the heat setting.

5. The method of claim 1, wherein the thermoplastic binder material is selected from:
a copolyamide constructed from at least two different monomers selected from the group of caprolactam, laurin lactam, dicarboxylic acids with 4-12 C-atoms, terephthalic acid, isophthalic acid, dimer acid with C-atoms, linear alpha, omega diamines with 2-12 C-atoms and 2-methyl pentamethylene diamine;
a polyamide selected from the group of polyamide 12, polyamide 11 and polyamide 6;
a polyolefin selected from the group of polyethylene, polypropylene and polybutylene;
a thermoplastic elastomer based on polyamide, silicone, polyurethane, polyester or polyether; and
a copolyester.

6. The method of claim 1, wherein thermoplastic, spunbonded polymer fibers, a portion of them optionally in the form of flat fibers, and consisting of a polyamide selected from the group of polyamide 6, polyamide 46, polyamide 66, polyamide 12, polyamide 11, polyamide 6T/66, polyamide 6T/6, polyamide 6T/61 and polyamide 12T, are used for the nonwoven layer.

7. The method of claim 1, wherein only fibers with a titer less than 30 dtex are used for the nonwoven layer.

8. The method of claim 4, wherein the materials with the lower melting component for the thermoplastic binder material and with the higher melting component for the nonwoven layer are used in one of the following combinations:
copolyamide with melting point in the range of 110 to 180° C. and polyamide 6;
copolyamide with melting point in the range of 110 to 180° C. and polyamide 66;
polyamide 6 and polyamide 66;

polyamide 12 and polyamide 6;
polyamide 12 and polyamide 66;
polyamide 6 and polyamide 6T/6I;
polyamide 6 and polyamide 6T/66; or
polyamide 6 and polyamide 6T/6.

9. The method of claim 1, wherein between the thermoplastic binder material and the nonwoven layer, a weight ratio between 5:95 and 95:5 is chosen.

10. The method of claim 1, wherein bicomponent fibers are used for the nonwoven layer to make the untreated press felt, in which the two components are present in the core and mantle and/or side by side configuration.

11. The method of claim 10, wherein additional fine-titer monocomponent fibers and/or flat fibers are mixed in with the bicomponent fibers to prepare the nonwoven layer.

12. The method of claim 1, wherein the untreated press felt is prepared from several nonwoven layers, wherein at least one of the additional nonwoven layers likewise contains a thermoplastic binder material distributed in the form of thermoplastic adhesive fibers and/or as thermoplastic adhesive component of bicomponent fibers.

13. The method of claim 12, wherein fibers with a finer titer are used for the nonwoven layer next to the paper side surface than for the at least one additional nonwoven layer.

14. The method of claim 12, wherein in the nonwoven layer adjacent to the paper side surface of the press felt, the ratio of the thermoplastic binder material to the other material of this layer is chosen greater than in one of the other nonwoven layers.

15. The method of claim 1, wherein the untreated press felt has a backing fabric or a backing layer and the nonwoven layer is stitched onto the backing fabric or backing layer.

16. A method for making a press felt with a smoothed permeable surface on its paper side for use in the press section of a paper machine, wherein the press felt comprises a nonwoven layer lying on its paper side surface, the paper side surface of said layer being bonded and fixed by a thermoplastic binding material, the method comprising the steps:

making an untreated press felt containing at least one load-bearing backing fabric, the nonwoven layer and the thermoplastic binder material, in which the thermoplastic binder material is contained in the form of thermoplastic adhesive fibers and/or as thermoplastic adhesive component of bicomponent fibers, distributed in the nonwoven layer;

heating the untreated press felt to a temperature lying above the melting point of the thermoplastic binder material; and cooling the heated press felt to a temperature lying below the melting point of the thermoplastic binder material while applying pressure with a smooth surface;

wherein the untreated press felt is fashioned as an endless web and placed under tension around a heated calendar roller and another calendar roller, arranged in parallel with this, and with the paper side surface of the untreated press felt oriented against the surface of the heated calendar roller;

wherein a cooling surface is arranged between the two calendar rollers pushing the web somewhat outward thereby applying a pressing force onto the paper side surface of the untreated press felt;

wherein the untreated press felt is moved across the heated roller in order to heat it, and across the cooling surface to cool it down; and wherein the paper side surface of the nonwoven layer is smoothed by the application of pressure from the smooth cooling during the cooling of said layer surface from a temperature in excess of the melting temperature of the thermoplastic binding material to a temperature below this melting temperature.

\* \* \* \* \*